United States Patent
Yoshimura et al.

(10) Patent No.: US 8,163,869 B1
(45) Date of Patent: Apr. 24, 2012

(54) PURIFICATION METHOD OF CARBOXYL GROUP-CONTAINING POLYOXYETHYLENE DERIVATIVE

(75) Inventors: Shuichi Yoshimura, Kanagawa (JP);
Ken-ichiro Nakamoto, Kanagawa (JP);
Satoshi Matsuo, Kanagawa (JP);
Takashi Ichikawa, Kanagawa (JP)

(73) Assignee: NOF Corporation, Tokyo (JP)

( * ) Notice: Subject to any disclaimer, the term of this patent is extended or adjusted under 35 U.S.C. 154(b) by 0 days.

(21) Appl. No.: 12/979,023

(22) Filed: Dec. 27, 2010

(51) Int. Cl.
*C08F 6/00* (2006.01)
*C08C 2/06* (2006.01)

(52) U.S. Cl. ........ 528/496; 526/262; 526/285; 526/322; 528/313

(58) Field of Classification Search ............ 526/262, 526/285, 322; 528/313
See application file for complete search history.

(56) References Cited

U.S. PATENT DOCUMENTS

| | | | |
|---|---|---|---|
| 5,298,410 A | | 3/1994 | Phillips et al. |
| 5,932,462 A | | 8/1999 | Harris et al. |
| 2010/0286361 A1* | | 11/2010 | Yoshimura et al. ......... 528/482 |
| 2010/0292515 A1 | | 11/2010 | Yamamoto et al. |

FOREIGN PATENT DOCUMENTS

| | | |
|---|---|---|
| JP | 2008-514693 T | 5/2008 |
| WO | 2007/024066 A1 | 3/2007 |

* cited by examiner

*Primary Examiner* — Terressa Boykin
(74) *Attorney, Agent, or Firm* — Sughrue Mion, PLLC

(57) ABSTRACT

An object of the present invention is to provide a purification method of separating impurities from a carboxyl group-containing polyoxyethylene derivative having a molecular weight of 2,000 to 100,000.

The purification method according to the invention includes the following steps.

The polyoxyethylene derivative is dissolved to form a solution using toluene, xylene, benzene, ethyl acetate, or butyl acetate in an amount 5 times by mass or more the amount of the polyoxyethylene derivative. A slurry is formed by adding to the solution an inorganic adsorbent containing at least one of an oxide and a hydroxide of one or more elements selected from the group consisting of magnesium, silicon, and aluminum in an amount 0.5 to 10 times by mass the amount of the polyoxyethylene derivative. The slurry is stirred at a temperature of 25° C. or higher. Toluene, xylene, benzene, ethyl acetate, or butyl acetate is added to a filtration cake obtained by filtration of the slurry, and further filtration is performed. Methanol, ethanol, or 2-propanol is added to the filtration cake in an amount 5 times by mass or more the amount of the polyoxyethylene derivative, filtration is performed, and the polyoxyethylene derivative is recovered from the resulting filtrate.

15 Claims, No Drawings

PURIFICATION METHOD OF CARBOXYL GROUP-CONTAINING POLYOXYETHYLENE DERIVATIVE

TECHNICAL FIELD

The present invention relates to a purification method of a high-molecular-weight carboxyl group-containing polyoxyethylene derivative.

BACKGROUND ART

In recent years, polyoxyethylene derivatives have very frequently used as materials for imparting a circulation in blood, a targeting function and the like toward a target site to polypeptides, enzymes, antibodies and genes, nucleic acid compounds including oligonucleic acids, nucleic acid drugs, and other physiologically active substances. This is because the derivatives exhibit a low interaction with other biological components owing to a steric repulsion effect thereof. A physiologically active substance modified with the polyoxyethylene derivative or a drug carrier obtained by modifying liposome or the like with the polyoxyethylene derivative is known to exhibit a longer circulation in blood in the body than that of unmodified one. Moreover, it has been reported that this effect increases as the molecular weight of the polyoxyethylene derivative increases. Further, it is also possible to impart the targeting function by attaching an active group or an antibody to an end of the polyoxyethylene derivative. Thus, the polyoxyethylene derivatives become very useful and indispensable materials in the field of drug delivery system. Of these, a polyoxyethylene derivative having a carboxyl group is a very important starting material as an intermediate of various active ester groups. From the viewpoint of performance and safety of drugs produced by using the derivative, as the polyoxyethylene derivative having a carboxyl group, one having a high purity and containing less amount of impurities has been desired. At present, as the polyoxyethylene derivatives having a carboxyl group, those having various skeletons or other functional groups have been developed, and impurities produced as by-products are diversified depending on production methods of the derivatives. The following will show examples of the impurities.

A polyoxyethylene derivative having a carboxyl group can be generally synthesized by using a polyoxyethylene derivative having a hydroxyl group as a starting material and oxidizing the end hydroxyl group into a carboxyl group. Usually, in the case of an end modification reaction of a polyoxyethylene derivative, since the reaction occurs at a polymer end, concentration of the reaction site in the molecule decreases and thus reaction conversion gets worse, so that the hydroxyl group may remain.

Moreover, as the molecular weight increases, viscosity of the reaction solution increases and reaction conversion gets worse, so that unreacted hydroxyl group remains. In the case of a multi-arm type polyoxyethylene derivative having a large number of hydroxyl groups, impurities having different numbers of unreacted hydroxyl groups form at the end modification. In general, since the derivative having an end hydroxyl group and the derivative having an end carboxyl group are similarly polyoxyethylene derivatives, purification is difficult. Particularly, as the molecular weight increases, the physical properties thereof become more resemble and hence separation and purification are difficult. Moreover, in the case of the polyoxyethylene derivative in which such an end unreacted hydroxyl group remains, dimerization proceeds in the following active ester formation and hence purity of the active ester compound is remarkably decreased.

In addition, in the case where impurities such as the derivative having a hydroxyl group or the dimmer have remained, the impurities remains as polymer impurities also at a drug modification reaction in a later step, so that the resulting drug becomes inhomogeneous and is problematic as a pharmaceutical preparation.

As a purification method of the polyoxyethylene derivative having a carboxyl group at an end, a column chromatographic purification using an ion-exchange resin shown below is known (Patent Document 1 (U.S. Pat. No. 5,298,410): Patent Document 2 (JP-T-2008-514693)). In these Patent Documents, for the purpose of removing a diol compound contained in methoxypolyethylene glycol, there is disclosed a method of modifying the hydroxyl group into a carboxyl group and subsequently separating and fractionating a monocarboxyl compound and a dicarboxyl compound by ion-exchange chromatography. As a specific purification method, after an end carboxyl group-containing methoxypolyethylene glycol derivative (molecular weight: 20,000) is dissolved in distilled water to form an approximately 2% aqueous solution and the solution is charged onto an ion-exchange resin, distilled water is introduced thereto to separate the impurity from the objective material. The resulting fractionated fraction is further diluted to form an approximately 1% aqueous solution. After pH adjustment, purification is achieved by performing extraction with dichloromethane, dehydration, and crystallization. However, in the case of column chromatographic purification using an ion-exchange resin as described above, a sample should be a highly diluted one (an aqueous solution having a PEG concentration of 1 to 2%). This is because the objective material is a carboxyl compound only at a polymer end and exhibits an extremely low interaction with the ion-exchange resin. Moreover, in order to remove water from the dilute aqueous solution after fractionation to obtain the objective material, a large-volume extraction apparatus is needed.

In addition, efficiency is poor also from the consideration of the required time from the purification until the recovery of the objective material, so that the purification by the ion-exchange chromatography is problematic as an industrial production method.

As another example of the polyoxyethylene derivative having a carboxyl group, there is a method of synthesizing the derivative by chemically bonding a methoxypolyoxyethylene derivative to an amino group or a thiol group of a compound containing a carboxyl group, such as an amino acid.

As a specific example, Patent Document 3 (U.S. Pat. No. 5,932,462) describes a synthetic method of a polyoxyethylene derivative (molecular weight: 40,000) where two chains of a methoxypolyoxyethylene derivative (molecular weight: 20,000) are introduced into two amino groups of lysine and a purification method thereof. The impurities in this case include the unreacted methoxypolyoxyethylene derivative having a molecular weight of 20,000, one (molecular weight: 20,000) where one chain thereof is introduced into lysine, further one (molecular weight: 40,000 or more) where a diol compound (molecular weight: 40,000) that is an impurity in the methoxypolyoxyethylene derivative (molecular weight: 20,000) is introduced into lysine, one (molecular weight: 40,000 or more) where three chains of the polyoxyethylene derivative are introduced into a dimer that is an impurity in lysine, and the like.

As a purification method of the impurities as described above, Patent Document 3 (U.S. Pat. No. 5,932,462) proposes column chromatography on an ion-exchange resin. Specifically, an aqueous solution adjusted so that concentration of the polyoxyethylene derivative becomes 0.2% is charged into a column of the ion-exchange resin and fractionation is performed using ion-exchange water as an eluent. On this occasion, the impurities having a molecular weight of 20,000 are eluted faster than the objective material and then the objective material is eluted. After the objective material, there are eluted the impurities having a molecular weight of 40,000 or more and the impurity where one chain of the methoxypolyoxyethylene derivative is introduced into a lysine having a molecular weight of 20,000. In order to fractionate the impurities and the objective material, it is necessary to collect aqueous solutions containing the objective material alone through fine fractionation and analysis of eluting solutions during purification. In addition, this method is a method of separating a high-molecular-weight polyoxyethylene derivative and hence it is necessary to dilute a sample to be charged into a column to a degree more than the degree in the method described above (solution concentration: 0.2%). Moreover, since the purification is performed in an aqueous solution, steps of extraction, dehydration, concentration, and crystallization are subsequently necessary and thus operations are extremely vexatious and complex. When required time and apparatus to be used for the amount to be purified and the treatment of the distilled water and organic solvent used for the purification are considered, the purification by the column chromatography is industrially disadvantageous as in the case of the method described above.

BACKGROUND ART DOCUMENTS

Patent Documents

Patent Document 1: U.S. Pat. No. 5,298,410
Patent Document 2: JP-T-2008-514693
Patent Document 3: U.S. Pat. No. 5,932,462

DISCLOSURE OF THE INVENTION

Problems that the Invention is to Solve

An object of the invention is to provide a method for producing a polyoxyethylene derivative having a carboxyl group, which is high pure and has a high molecular weight, with reducing impurities contained in the main component.

Means for Solving the Problems

As a result of the extensive studies for solving the above problems, the present inventors separate a polyoxyethylene derivative having no carboxyl group as an impurity to a filtrate side by subjecting a high-molecular-weight polyoxyethylene derivative to an adsorption operation using an inorganic adsorbent containing at least one of an oxide and a hydroxide of one or more elements selected from the group consisting of magnesium, silicon, and aluminum in an organic solvent such as toluene or ethyl acetate to adsorb an objective polyoxyethylene derivative having a carboxyl group and performing filtration. Further, the present method is a method of letting impurities having two or more carboxyl groups remain on the adsorbent by desorbing the objective polyoxyethylene derivative having a carboxyl group from the adsorbent on the filter paper using an alcohol solvent such as ethanol and performing filtration, and is a purification method capable of obtaining a highly pure and high-molecular-weight polyoxyethylene derivative by separation regardless of impurities and molecular weight of the objective material.

According to the invention, very convenient purification can be achieved through only a mode of mixing an adsorbent as a filtration aid in advance into a solution containing a polyoxyethylene derivative dissolved therein and performing filtration without column chromatography.

Namely, the invention relates to the following methods.

A purification method of separating impurities from a carboxyl group-containing polyoxyethylene derivative having a molecular weight of 2,000 to 100,000, which is represented by the general formula [1]:

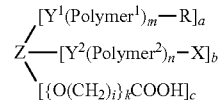

[1]

wherein Z is a residual group of a polyhydric alcohol having 2 to 8 active hydrogen atoms, an amino acid or a peptide; $Y^1$ and $Y^2$ are an ether bond, an amide bond, an ester bond, a urethane bond, a carbonate bond, a secondary amino group, a thioether bond, a disulfide bond, a thioester bond, or an alkylene group containing them; Polymer$^1$ and Polymer$^2$ are a linear polyoxyethylene chain or a branched polyoxyethylene chain; R is a hydrocarbon group having 1 to 7 carbon atoms or an acetal group having 3 to 9 carbon atoms; X is an amino group, a protected amino group, a carboxyl group, a protected carboxyl group, an aldehyde group, a protected aldehyde group, a hydroxyl group, a protected hydroxyl group, a thiol group, a protected thiol group, a sulfonyl group, a vinyl group, an allyl group, a cyano group, or an alkylene group containing them; m and n are each as follows: m=1 or 0, n=1 or 0, and $1 \leq m+n$; i and k are each as follows: $1 \leq i \leq 5$ and k=1 or 0; a, b, and c are each an integer satisfying the following: $0 \leq a$, $0 \leq b$, $1 \leq c$ and $1 \leq a+b$, and $2 \leq a+b+c \leq 8$; in the case where a, b, and c are an integer of 2 or more, $Y^1$ and $Y^2$, Polymer$^1$, Polymer$^2$, R, X, m, n, i, and k may be the same or different in the molecule, said method comprising the following steps (A) to (E):

(A) a step of dissolving the polyoxyethylene derivative to form a solution using an organic solvent selected from the group consisting of toluene, xylene, benzene, ethyl acetate, and butyl acetate in an amount 5 times by mass or more the amount of the polyoxyethylene derivative, (B) a step of forming a slurry by adding to the solution an inorganic adsorbent containing at least one of an oxide and a hydroxide of one or more elements selected from the group consisting of magnesium, silicon, and aluminum in an amount 0.5 to 10 times by mass the amount of the polyoxyethylene derivative, (C) a step of stirring the slurry at a temperature of 25° C. or higher, (D) a step of adding an organic solvent selected from the group consisting of toluene, xylene, benzene, ethyl acetate, and butyl acetate to a filtration cake obtained by filtration of the slurry and further performing filtration, and (E) a step of adding to the filtration cake an organic solvent selected from the group consisting of methanol, ethanol, and 2-propanol in an amount 5 times by mass or more the amount of the polyoxyethylene derivative, performing filtration, and recovering the polyoxyethylene derivative from the resulting filtrate.

The method, wherein $Y^1$ is a urethane bond or an ether bond, Polymer$^1$ is a linear polyoxyethylene chain, R is a methyl group, m=1, a=1 or 2, b=0, and c=1 in the polyoxyethylene derivative represented by the general formula [1].

The method, wherein Z is a residual group of lysine, $Y^1$ is a urethane bond, k=0, and a=2 in the polyoxyethylene derivative represented by the general formula [1].

The method, wherein molecular weight of the polyoxyethylene derivative represented by the formula [1] is 10,000 to 100,000.

The method, wherein the amount of the adsorbent is 2 to 6 times by mass the amount of the polyoxyethylene derivative.

The method, wherein the organic solvent in the step (A) is selected from toluene and ethyl acetate.

The method, wherein the organic solvent in the step (E) is selected from methanol and ethanol.

The method, wherein the amount of the organic solvent in the step (A) is 10 to 20 times by mass the amount of the polyoxyethylene derivative.

The method, wherein the amount of the organic solvent in the step (E) is 10 to 20 times by mass the amount of the polyoxyethylene derivative.

Advantage of the Invention

According to the present invention, separation and purification to a high purity is possible depending on the presence or absence of a carboxyl group or the number thereof, regardless of the molecular weight of an objective material, the molecular weight and structure of impurities, and the functional groups contained therein. Furthermore, since operations are easy in the invention, the method exhibits a good reproducibility in scale-up to industrial production and thus is a very suitable purification method. The high-molecular-weight polyoxyethylene derivative obtained by the purification method of the invention has a less content of the impurities and is highly pure. Moreover, a highly pure one is easily obtained by the production according to the production method of the invention. Bio-related substances modified with the high-molecular-weight polyoxyethylene derivative of the invention contain a small amount of impurities and are excellent in safety and stability, so that they are suitable for medicament, perfume and cosmetic fields and thus are useful.

MODE FOR CARRYING OUT THE INVENTION

The detail of the invention is a method of purifying a polyoxyethylene derivative having a molecular weight of 2,000 to 100,000, which is represented by the general formula [1], by an adsorption treatment step including operations of (A) to (E).

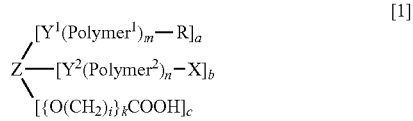

Z is a residual group of a polyhydric alcohol having 2 to 8 active hydrogen atoms, an amino acid or a peptide. Specific compounds include polyhydric alcohols such as ethylene glycol, propylene glycol, trimethylene glycol, isopropylene glycol, butylene glycol, tetramethylene glycol, trimethylolpropane, glycerin, diglycerin, triglycerin, tetraglycerin, pentaglycerin, hexaglycerin, erythritol, pentaerythritol, dipentaerythritol, sorbitol, mannitol, and xylitol; or amino acids having an amino group, a carboxyl group or a thiol group, such as lysine and glutamic acid and peptides which are dimers or trimers thereof. Preferred compounds are ethylene glycol, glycerin, pentaerythritol, xylitol, lysine, and glutamic acid, and more preferred are ethylene glycol, glycerin, and lysine, and further preferred is lysine.

The residual group means a residual group where a functional group having an active hydrogen group such as a hydroxyl group, an amino group, a carboxyl group or a thiol group is removed.

$Y^1$ and $Y^2$ is a connecting group between Z and the polyoxyethylene chain and is not particularly restricted so long as it is a covalent bond. Preferably, there may be mentioned an ether bond, a thioester bond, a thioether bond, an ester bond, a urethane bond, an amide bond, a carbonate bond, a secondary amino group, a disulfide bond, and an alkylene group containing them. Preferred connecting bonds are shown in the following:

in the case where Z is a residual group of a polyhydric alcohol having 2 to 8 active hydrogen atoms, when the polyoxyethylene derivative is bonded to a hydroxyl group of the polyhydric alcohol,

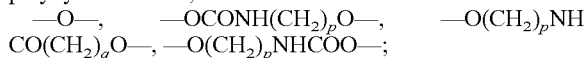

in the case where Z is a residual group of an amino acid or peptide, when the polyoxyethylene derivative is bonded to an amino group of the amino acid or peptide,

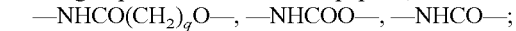

in the case where Z is a residual group of an amino acid or peptide, when the polyoxyethylene derivative is bonded to a carboxyl group of the amino acid or peptide,

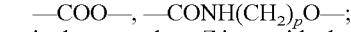

in the case where Z is a residual group of an amino acid or peptide, when the polyoxyethylene derivative is bonded to a thiol group of the amino acid or peptide,

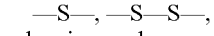

wherein p and q are as follows: p=2 or 3 and q=an integer of 1 to 5.

$Polymer^1$ and $Polymer^2$ are a linear polyoxyethylene chain or a branched polyoxyethylene chain. The branched polyoxyethylene chain is a polyoxyethylene chain which branches into two or more chains via a branching point in the midway. Two or more branching points may be present. An example is a polyoxyethylene chain which has a polyhydric alcohol such as glycerin as a branching point as shown in the following formula (i) and branches into two or more chains.

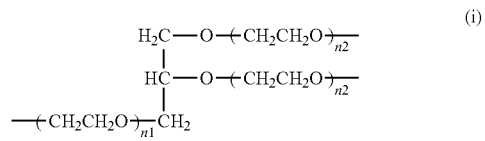

R is a hydrocarbon group having 1 to 7 carbon atoms or an acetal group having 3 to 9 carbon atoms. Specific hydrocarbon groups and acetal groups include a methyl group, an ethyl group, a propyl group, an isopropyl group, a butyl group, a t-butyl group, a pentyl group, an isopentyl group, a cyclopentyl group, a hexyl group, a 2-hexyl group, a 3-hexyl group, a cyclohexyl group, a phenyl group, a benzyl group, a diethylacetal group, a dimethylacetal group, a diisopropylacetal group, a 1,3-dioxolane, and the like. Preferred hydrocarbon groups are a methyl group, a t-butyl group, and a benzyl group and preferred acetal group is a diethylacetal.

X is an amino group, a protected amino group, a carboxyl group, a protected carboxyl group, an aldehyde group, a protected aldehyde group, a hydroxyl group, a protected hydroxyl group, a thiol group, a protected thiol group, a sulfonyl group, a vinyl group, an allyl group, a cyano group, and an alkylene group containing them. As the alkylene group, there may be specifically mentioned a methylene group, an ethylene group, a propylene group, an isopropylene group, a butylene group, an isobutylene group, a pentylene group, an isopentylene group, a hexylene group, and the like. Preferred are a methylene group, an ethylene group, and a propylene group and more preferred is an ethylene group.

m and n are as follows: m=1 or 0, n=1 or 0, and $1 \leq m+n$; i and k are each as follows: $1 \leq i \leq 5$ and k=1 or 0; a, b, and c are each an integer satisfying the following: $0 \leq a$, $0 \leq b$, $1 \leq c$ and $1 \leq a+b$, and $2 \leq a+b+c \leq 8$; in the case where a, b, and c are an integer of 2 or more, $Y^1$ and $Y^2$, Polymer$^1$, Polymer$^2$, R, X, m, n, i, and k may be the same or different in the molecule.

The molecular weight of the polyoxyethylene derivative is 2,000 to 100,000. However, in the pharmaceutical preparations using polyoxyethylene derivatives (PEG-modified drugs) in recent medical uses, a higher circulation in blood is obtained as the molecular weight increases, so that desired molecular weight of the polyoxyethylene derivative tends to increase. Therefore, an upper limit is not particularly restricted but the molecular weight of the polyoxyethylene derivative is preferably 6,000 to 100,000, more preferably 10,000 to 100,000, further preferably 20,000 to 80,000, and most preferably 30,000 to 50,000.

The following will describe each of the steps in detail.

"(A) Step of dissolving the polyoxyethylene derivative to form a solution using an organic solvent selected from toluene, xylene, benzene, ethyl acetate, and butyl acetate in an amount 5 times by mass or more the amount of the polyoxyethylene derivative"

The solvent is an organic solvent selected from toluene, xylene, benzene, ethyl acetate, and butyl acetate and is desirably a solvent which has a low polarity and exhibits a high solubility of the polyoxyethylene derivative. Preferred organic solvents are toluene and ethyl acetate and more preferred is toluene. A highly polar solvent is not preferred since the solvent inhibits an interaction between the polyoxyethylene derivative and the adsorbent.

The amount of the solvent is desirably 5 times by mass or more the amount of the polyoxyethylene derivative represented by the general formula [1]. When the amount is less than 5 times by mass, viscosity of the solution is high and purification efficiency becomes worse as well as the yield ratio becomes worse, so that 5 times by mass or more is advantageous at production. Even when the amount of the solvent is 30 times by mass or more, purification efficiency does not change and is good but, in the subsequent filtration operation, the volume to be treated increases, the number of man-hour increases, and the yield decreases, so that the amount is disadvantageous in view of the cost. For these reasons, the amount of the solvent is preferably 5 to 30 times by mass, more preferably 10 to 20 times by mass, and particularly preferably 15 to 20 times by mass.

Using the above solvent, dissolution of the polyoxyethylene derivative is carried out. The charging order into a treatment container may be either the polyoxyethylene derivative or the organic solvent. Depending on the molecular weight of the polyoxyethylene derivative, there is a case where heating is necessary. The method is not particularly restricted but the dissolution can be generally achieved by heating to 30° C. or higher.

"(B) Step of forming a slurry by adding to the solution an inorganic adsorbent containing at least one of an oxide and a hydroxide of one or more elements selected from the group consisting of magnesium, silicon, and aluminum in an amount 0.5 to 10 times by mass the amount of the polyoxyethylene derivative"

In the adsorbent used in the invention, the oxide or hydroxide of magnesium, silicon, and aluminum is magnesium oxide, aluminum oxide, silicon oxide, or a composite oxide of two or three thereof, or magnesium hydroxide, aluminum hydroxide, silicon hydroxide, or a composite hydroxide of two or three thereof.

In the inorganic adsorbent, these oxides (including the composite oxides) and hydroxides (including composite hydroxides) may be contained singly or a mixture of two or more thereof may be contained. The inorganic adsorbent may further contain a hydrate.

Specific examples include Kyoward series manufactured by Kyowa Chemical Industry Co., Ltd., Kyoward 200B ($Al_2O_3.H_2O$), Kyoward 200 ($Al(OH)_3.xH_2O$)(x is as follows: $1 \leq x \leq 3$), Kyoward 500 ($Mg_6Al_2(OH)_{16}CO_3.4H_2O$), Kyoward 700 ($Al_2O_3.9SiO_2.H_2O$), Kyoward 1000 ($Mg_{4.5}Al_2(OH)_{13}CO_3.3.5H_2O$), and Kyoward 2000 ($Mg_{0.7}Al_{0.3}O_{1.15}$). The above individual inorganic adsorbents may be used singly or as a mixture.

For separating the polyoxyethylene derivative having a carboxyl group from the polyoxyethylene derivative having no carboxyl group, it is advantageous to use an adsorbent exhibiting interaction with the carboxyl group. From this viewpoint, particularly preferred inorganic adsorbents are $Al_2O_3.H_2O$, $Al(OH)_3.xH_2O$(x is as follows: $1 \leq x \leq 3$), and $Mg_{0.7}Al_{0.3}OH_{1.15}$, and further preferred is $Al_2O_3.H_2O$.

The amount of the adsorbent is desirably in the range of 0.5 to 10 times by mass the amount of the polyoxyethylene derivative represented by the general formula [1]. When the amount is less than 0.5 time by mass, a sufficient purification efficiency is not obtained. When the amount is more than 10 times by mass, the volume to be treated increases, the yield ratio decreases, and the number of man-hour increases. For these reasons, the amount of the adsorbent is preferably 1 to 6 times by mass and more preferably 2 to 6 times by mass.

In the step (B), a slurry can be obtained by adding the adsorbent to the solution of the step (A) and stirring them. The stirring time for obtaining the slurry is included in the stirring time in the subsequent step (C).

"(C) Step of stirring the slurry at a temperature of 25° C. or higher"

This step is a step of stirring the slurry obtained in the step (B) and subjecting it to an adsorption treatment. The treating temperature is 25° C. or higher and preferably 25 to 80° C. At a temperature higher than 80° C., there is a fear of deterioration of the polyoxyethylene derivative. At a temperature lower than 25° C., viscosity of the solution is high and purification efficiency becomes worse. Moreover, since crystals may precipitate depending on the structure and molecular weight of the polyoxyethylene derivative, the temperature is desirably 25° C. or higher. A preferred temperature range is 40 to 80° C. and more preferred is 40 to 60° C. The slurry is stirred in the above temperature range for 30 minutes or more under an inert gas atmosphere or with introducing the gas, thereby performing the adsorption treatment. The stirring time is preferably 30 minutes or more for performing a sufficient adsorption. An upper limit is not restricted but is preferably less than 20 hours since there is a fear of deterioration by heat history. By this operation, preferential adsorption is realized since a carboxyl group exhibits a larger interaction with the adsorbent as compared with a hydroxyl group.

"(D) Step of filtrating the slurry, adding an organic solvent selected from toluene, xylene, benzene, ethyl acetate, and butyl acetate to a filtration cake, and further performing filtration"

This step is a step of separating the absorbent from the solvent in which the impurities are dissolved, from the adsorption treatment solution of the above step (C). A method of removing the adsorbent is not particularly restricted. In general, the removal is performed by filtration under reduced pressure, centrifugal filtration or pressurized filtration. On this occasion, for the purpose of preventing the precipitation of crystals owing to decrease in temperature at the filtration, it is desirable to heat a filtration apparatus to a temperature the same as the treating temperature in the step (C) beforehand. Moreover, a filtration aid may be put on a filter paper beforehand in order to improve filtration property.

After the filtration of the slurry solution, an organic solvent selected from toluene, xylene, benzene, ethyl acetate, and butyl acetate is added and filtration is further performed, thereby removing the impurities that remain in the filtration cake. The organic solvent to be used is desirably a solvent the same as the solvent of the adsorption treatment solution.

The amount of the solvent is desirably 5 times by mass or more the amount of the polyoxyethylene derivative represented by the general formula [1]. When the amount is less than 5 times by mass, the impurities cannot be sufficiently removed from the filtration cake, so that 5 times by mass is advantageous. Even when the amount of the solvent is 30 times by mass or more, purification efficiency does not change and is good but, in the subsequent filtration operation, the volume to be treated increases, the number of man-hour increases, and the yield decreases, so that the amount is disadvantageous in view of the cost. For these reasons, the amount of the solvent is preferably 5 to 30 times by mass and more preferably 10 to 20 times by mass. Furthermore, removing efficiency of the impurities increases when the solvent is heated to the temperature at the treatment beforehand.

"(E) Step of adding an organic solvent selected from methanol, ethanol, and 2-propanol in an amount 5 times by mass or more the amount of the polyoxyethylene derivative and recovering the polyoxyethylene derivative from the filtration cake"

The solvent is an organic solvent selected from methanol, ethanol, and 2-propanol and is desirably a solvent which has a high polarity and exhibits a high solubility of the polyoxyethylene derivative. Preferred solvents are methanol and ethanol and more preferred is ethanol.

The amount of the solvent is desirably 5 times by mass or more the amount of the polyoxyethylene derivative represented by the general formula [1]. When the amount is less than 5 times by mass, viscosity of the solution is high and purification efficiency becomes worse as well as the yield ratio becomes worse, so that 5 times by mass or more is advantageous at production. Even when the amount of the solvent is 30 times by mass or more, purification efficiency does not change and is good but, in the subsequent filtration operation, the volume to be treated increases and the number of man-hour increases, so that the amount is disadvantageous in view of the cost. For these reasons, the amount of the solvent is preferably 5 to 30 times by mass and more preferably 10 to 20 times by mass.

Using the above solvent, the polyoxyethylene derivative having a carboxyl group that is the objective material is desorbed and recovered from the filtration cake after filtration. As methods for recovery, there may be mentioned a method of adding the heated solvent to an filtration apparatus, performing filtration, and isolating the derivative from the resulting filtrate and a method of again transforming the filtration cake into a slurry with the solvent, subsequently performing filtration, and isolating the derivative from the resulting filtrate.

In the former method, recovery efficiency increases when the solvent is heated to the temperature at the treatment in the step (C).

The latter method includes the same operations as in the steps (C) and (D) in which a solvent to be used is changed to the above solvent. Since the filtration cake is sufficiently mixed with the solvent in the latter, the recovery efficiency becomes higher in the latter method than in the former method.

In this case, in order to improve the filtration property, a filtration aid may be put on a filter paper beforehand. The filtration aid herein is a powder for preventing clogging of the filter paper, such as diatomaceous earth and, as an example, Oplite W-3050 (manufactured by Oplite Mining Co., Ltd.) or the like may be mentioned.

After filtration, improvement of the yield can be expected by further adding an organic solvent selected from methanol, ethanol, and 2-propanol and further performing filtration to recover the objective material remaining in the filtration cake. On this occasion, the organic solvent to be used is desirably the same solvent as that of the desorption treatment solution. The amount of the solvent is desirably 5 times by mass or more the amount of the polyoxyethylene derivative represented by the general formula [1]. When the amount is less than 5 times by mass, the impurities cannot be sufficiently removed from the filtration cake, so that 5 times by mass is advantageous. Even when the amount of the solvent is 30 times by mass or more, purification efficiency does not change and is good but, in the subsequent filtration operation, the volume to be treated increases and the number of man-hour increases, so that the amount is disadvantageous in view of the cost. For these reasons, the amount of the solvent is preferably 5 to 30 times by mass and more preferably 10 to 20 times by mass. Furthermore, removing efficiency of the impurities increases when the solvent is heated to the temperature at the treatment beforehand.

A method of isolating the objective material from the filtrate is not particularly restricted but a method by evaporation under reduced pressure or a method by reprecipitation is preferred.

The operations described in the above can be repeatedly carried out with returning to the step (A) or the step (E) again after the operations of the steps (A) to (E). Moreover, when the operations are repeatedly carried out, purification efficiency is increased in some cases by changing a combination, for example, changing the kind or amount of the adsorbent and the organic solvent to be used between at the first time and at the second time. This varies depending on the number of the carboxyl group of the polyoxyethylene derivative to be purified and the number, kind, content of the impurities contained, but the change is particularly effective in the case where an impurity exhibiting a weaker interaction with the adsorbent and an impurity exhibiting a stronger interaction with the adsorbent than the interaction that the objective material exhibits are mixed. In general, in the case where impurities exhibiting a weak interaction with the adsorbent (impurities such as polyoxyethylene derivatives having no carboxyl group) are removed, the purification efficiency increases when toluene is used as the solvent in the step (A) and an adsorbent having a strong adsorbing force for the objective material is used. Contrarily, in the case where impurities having a strong interaction with the adsorbent (impurities such as polyoxyethylene derivatives having two or more carboxyl groups) are removed, the purification efficiency gets better when an adsorbent having a weak adsorbing force for the objective material is used and ethanol is used as the solvent in the step (D). With regard to the amount of the adsorbent, the most suitable amount may be appropriately used particularly depending on the content of the impurities. In the case of impurities exhibiting a smaller interaction than the interaction that the objective material exhibits, the removing efficiency increases when the amount of the adsorbent is reduced as the impurities increase. In the case of impurities exhibiting a larger interaction than the interaction that the objective material exhibits, the removing efficiency increases when the amount of the adsorbent is increased as the impurities increase.

EXAMPLES

Polyoxyalkylene derivatives were synthesized by the following method.

After 548 g of lysine monohydrochloride was dissolved into 12 L of a 0.1M phosphate buffer solution adjusted to pH 8, 3 kg of MENP-20T (α-methoxy-ω-p-nitrophenylcarbonyl-polyoxyethylene having a molecular weight of 20,000) manufactured by NOF Corporation was added thereto, followed by stirring at room temperature overnight. After 24 kg of sodium chloride was dissolved into the reaction solution, extraction was performed using 30 kg of chloroform and the chloroform layer was washed with 12.5 kg of a 20% aqueous sodium chloride solution. After concentration, the residue was dissolved into 15 kg of toluene, dehydration was performed using 1 kg of magnesium sulfate, and filtration was performed. Crystallization was conducted with adding 12 kg of hexane to the filtrate and drying was performed, thereby obtaining 2.4 kg of a polyoxyethylene derivative where methoxypolyoxyethylene was introduced into one of two amino groups of lysine.

After 450 g of the resulting crystals were dissolved into 2.7 kg of anhydrous dimethylformamide, 114 g of triethylamine and 475 g of MENP-20T (α-methoxy-ω-p-nitrophenylcarbonyl-polyoxyethylene having a molecular weight of 20,000) manufactured by NOF Corporation were added thereto, followed by a reaction at 60° C. for 8 hours. To the reaction solution was added 4.5 kg of ethyl acetate, and 3.2 kg of hexane was further added, thereby resulting in crystallization. After crystals were dissolved in 5.85 kg of ethyl acetate and 3.15 kg of hexane was again added thereto to perform recrystallization, crystals were dried to obtain 940 g of a polyoxyethylene derivative where two chains of polyoxyethylene were introduced into two amino groups of lysine.

With regard to the purity of the resulting polyoxyethylene derivative, molecular weight distribution of the polymer was measured by gel permeation chromatography (GPC). The following will describe the measurement method and the results.

As a GPC system, LC-10AVP manufactured by SHIMADZU Corporation was used.

Developing solvent: N,N-dimethylformamide (10 mM, LiBr)
Flow rate: 0.7 ml/min,
Column: PL gel MIXED-D×2 (Polymer Laboratories),
Column temperature: 65° C.,
Detector: RI,
Sample amount: 30 mg/30 mL, Injection amount: 100 ul.
For GPC-measured values, with regard to high-molecular-weight impurities and low-molecular-weight-impurities, peaks were divided from inflection points with the main peak on a dissolution curve toward the baseline vertically and, from area values of the resulting individual peaks, area percentages of the individual peaks were calculated.

TABLE 1

| | |
|---|---|
| Objective Material Peak (%) | 83.9 |
| High-Molecular-Weight Impurities | 3.7 |
| Low-Molecular-Weight Impurities | 12.4 |

Here, the high-molecular-weight impurities include one where lysine is bonded to both ends of the polyoxyethylene having a molecular weight of 40,000 or more (derived from diol), one where three chains of the polyoxyethylene derivative are introduced into a dimer which is an impurity in lysine, and the like. The low-molecular-weight-impurities include the unreacted polyoxyethylene derivative having a molecular weight of 20,000 and a monosubstituted lysine methoxypolyoxyethylene derivative.

Using LY-400 obtained in the above method, the following will describe the invention in further detail with reference to Examples. Evaluation on that occasion was performed according to the following criteria.

In the case where the peak of the objective material after purification is 90% or more and the yield is 50% or more: ⊚

In the case where the peak of the objective material after purification is 90% or more and the yield is 20% or more: ○

In the case where the peak of the objective material after purification is 90% or more and the yield is 10% or more: Δ

In the case where the peak of the objective material after purification is less than 90%: X Example 1-1

After 30 g of the above polyoxyethylene derivative and 450 g of toluene were charged into a 1 L four-neck flask, a three-one motor, a cooling tube, and a nitrogen inlet tube were fitted thereto and the derivative was dissolved at 55° C. using a mantle heater. Thereto was added 120 g of Kyoward 200B (Kyowa Chemical Industry Co., Ltd.), and the whole was stirred at 50° C. for 1 hour, thereby performing an adsorption operation. A Nutsche funnel on which 5A filter paper and Oplite W-3050 (manufactured by Oplite Mining Co., Ltd.) had been laid was prepared and suction filtration was performed. Thereafter, the filtration cake was washed with 300 g of toluene which had been heated to 50° C. beforehand. Then, ethanol was added to the filtration cake and the whole was heated and stirred at 50° C., followed by suction filtration again. Further, the filtration cake was washed with 300 g of ethanol heated to 50° C. and the filtrate was collected. The filtrate was concentrated using an evaporator and the concentrate was dissolved into 150 g of ethyl acetate. Crystallization was performed with adding 100 g of hexane to the solution and the precipitated crystals were filtrated off and dried, thereby recovering a sample (21 g).

As a result, the methoxypolyethylene glycol impurity having a molecular weight of 20,000 was reduced to 2.0% and the high-molecular-weight impurities having a molecular weight of 40,000 or more were reduced to 2.0%, so that purification can be achieved to a GPC purity of 96.0%. Further, as a result of repeated treatment of the obtained objective material by the same operations, it was possible to improve the GPC purity to 98.5%.

Examples 1-2 to 7

The same operations as in Example 1-1 were performed except that the adsorbent shown in the following table was used as an adsorbent to be used for adsorption. The following shows the results.

TABLE 2

| Example | 1-1 | 1-2 | 1-3 | 1-4 | 1-5 | 1-6 | 1-7 |
|---|---|---|---|---|---|---|---|
| Adsorbent Species | Kw200B | Kw500 | Kw700 | Kw1000 | Kw2000 | silica gel | alumina |
| Objective Material Peak (%) | 96.0 | 93.2 | 92.3 | 93.8 | 96.2 | 90.2 | 90.1 |
| Yield (%) | 70 | 22.3 | 25.3 | 30 | 30 | 11.7 | 24 |
| Evaluation | ◎ | ○ | ○ | ○ | ○ | Δ | ○ |

Here, the adsorbent species of Examples 1-1 to 5 are product names of Kyoward series which are inorganic adsorbents manufactured by Kyowa Chemical Industry Co., Ltd.

Comparative Examples 1-1 to 1-2

The same operations as in the method of Example 1-1 were performed except that magnesium sulfate or calcium oxide shown below was used instead of the adsorbent. The following shows the results.

TABLE 3

| Comparative Example | 1-1 | 1-2 |
|---|---|---|
| Adsorbent Species | MgSO$_4$ | CaO |
| Objective Material Peak (%) | 83.9 | 83.9 |
| Yield (%) | 95 | 97 |
| Evaluation | × | × |

From the above results, no purification effect was observed.

Examples 1-8 to 1-9

The same operations as in Example 1-1 were performed except that the amount shown in the following table was used as an amount of the adsorbent to be used for adsorption. The following shows the results.

TABLE 4

| Example | 1-8 | 1-9 | 1-1 |
|---|---|---|---|
| Amount of Adsorbent | 2 times by mass | 3 times by mass | 4 times by mass |
| Objective Material Peak (%) | 95.2 | 95.6 | 96.0 |
| Yield (%) | 65 | 68 | 70 |
| Evaluation | ◎ | ◎ | ◎ |

From the above results, when the amount of the adsorbent increases, both of the effect and the yield tend to be improved but almost no difference is observed between the cases of 3 times by mass and 4 times by mass. A sufficient purification effect was observed even in the case of 2 times by mass, though it depends on the purity of the polyoxyethylene derivative before purification.

Examples 1-10

The same operations as in Example 1 were performed except that the solvent shown in the following table was used as a solvent in the step (A). The following shows the results.

TABLE 5

| Example | 1-1 | 1-10 |
|---|---|---|
| Solvent at Adsorption | toluene | ethyl acetate |
| Objective Material Peak (%) | 96.0 | 90.5 |
| Yield (%) | 70 | 19 |
| Evaluation | ◎ | Δ |

From the above results, an effect was observed even in the case of ethyl acetate but both of the purity and the yield are better in the case of toluene.

Comparative Examples 1-3 to 1-4

The same operations as in Example 1 were performed except that the solvent shown in the following table was used as a solvent in the step (A). The following shows the results.

TABLE 6

| Comparative Example | 1-3 | 1-4 |
|---|---|---|
| Solvent at Adsorption | chloroform | acetonitrile |
| Objective Material Peak (%) | 85.2 | 83.7 |
| Yield (%) | 17.3 | 31.7 |
| Evaluation | × | × |

From the above results, not much effect was observed in the case of the above solvents.

Examples 1-11 to 12

The same operations as in Example 1 were performed except that the amount shown in the following table was used as an amount of the solvent in the step (A). The following shows the results.

TABLE 7

| Example | 1-1 | 1-11 | 1-12 |
|---|---|---|---|
| Amount of Adsorbent | 15 times by mass | 10 times by mass | 30 times by mass |
| Objective Material Peak (%) | 96.0 | 92.5 | 96.1 |
| Yield (%) | 70 | 72 | 68 |
| Evaluation | ◎ | ◎ | ◎ |

From the above results, an effect is observed even in the case of 10 times by mass but the purification effect increases as the amount of the solvent increases. However, in the case of 15 times by mass or more, the purification effect hardly changes.

The invention claimed is:
1. A purification method of separating impurities from a carboxyl group-containing polyoxyethylene derivative having a molecular weight of 2,000 to 100,000, which is represented by the general formula [1]:

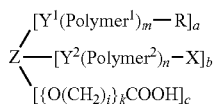

wherein Z is a residual group of a polyhydric alcohol having 2 to 8 active hydrogen atoms, an amino acid or a peptide; $Y^1$ and $Y^2$ are an ether bond, an amide bond, an ester bond, a urethane bond, a carbonate bond, a secondary amino group, a thioether bond, a disulfide bond, a thioester bond, or an alkylene group containing them; $Polymer^1$ and $Polymer^2$ are a linear polyoxyethylene chain or a branched polyoxyethylene chain; R is a hydrocarbon group having 1 to 7 carbon atoms or an acetal group having 3 to 9 carbon atoms; X is an amino group, a protected amino group, a carboxyl group, a protected carboxyl group, an aldehyde group, a protected aldehyde group, a hydroxyl group, a protected hydroxyl group, a thiol group, a protected thiol group, a sulfonyl group, a vinyl group, an allyl group, a cyano group, or an alkylene group containing them; m and n are each as follows: m=1 or 0, n=1 or 0, and $1 \leq m+n$; i and k are each as follows: $1 \leq i \leq 5$ and k=1 or 0; a, b, and c are each an integer satisfying the following: $0 \leq a$, $0 \leq b$, $1 \leq c$ and $1 \leq a+b$, and $2 \leq a+b+c \leq 8$; in case where a, b, and c are an integer of 2 or more, $Y^1$ and $Y^2$, $Polymer^1$, $Polymer^2$, R, X, m, n, i, and k may be same or different in the molecule, said method comprising the following steps (A) to (E):
(A) a step of dissolving the polyoxyethylene derivative to form a solution using an organic solvent selected from the group consisting of toluene, xylene, benzene, ethyl acetate and butyl acetate in an amount 5 times by mass or more the amount of the polyoxyethylene derivative,
(B) a step of forming a slurry by adding to the solution an inorganic adsorbent containing at least one of an oxide and a hydroxide of one or more elements selected from the group consisting of magnesium, silicon, and aluminum in an amount 0.5 to 10 times by mass the amount of the polyoxyethylene derivative,
(C) a step of stirring the slurry at a temperature of 25° C. or higher,
(D) a step of adding an organic solvent selected from the group consisting of toluene, xylene, benzene, ethyl acetate and butyl acetate to a filtration cake obtained by filtration of the slurry and further performing filtration, and
(E) a step of adding to the filtration cake an organic solvent selected from the group consisting of methanol, ethanol and 2-propanol in an amount 5 times by mass or more the amount of the polyoxyethylene derivative, performing filtration, and recovering the polyoxyethylene derivative from the resulting filtrate.

2. The method according to claim 1, wherein $Y^1$ is a urethane bond or an ether bond, $Polymer^1$ is a linear polyoxyethylene chain, R is a methyl group, m=1, a=1 or 2, b=0, and c=1 in the polyoxyethylene derivative represented by the general formula [1].

3. The method according to claim 2, wherein Z is a residual group of lysine, $Y^1$ is a urethane bond, k=0, and a=2 in the polyoxyethylene derivative represented by the general formula [1].

4. The method according to claim 1, wherein molecular weight of the polyoxyethylene derivative represented by the formula [1] is 10,000 to 100,000.

5. The method according to claim 3, wherein molecular weight of the polyoxyethylene derivative represented by the formula [1] is 10,000 to 100,000.

6. The method according to claim 1, wherein the amount of the adsorbent is 2 to 6 times by mass the amount of the polyoxyethylene derivative.

7. The method according to claim 3, wherein the amount of the adsorbent is 2 to 6 times by mass the amount of the polyoxyethylene derivative.

8. The method according to claim 1, wherein the organic solvent in the step (A) is selected from the group consisting of toluene and ethyl acetate.

9. The method according to claim 3, wherein the organic solvent in the step (A) is selected from the group consisting of toluene and ethyl acetate.

10. The method according to claim 1, wherein the organic solvent in the step (E) is selected from the group consisting of methanol and ethanol.

11. The method according to claim 3, wherein the organic solvent in the step (E) is selected from the group consisting of methanol and ethanol.

12. The method according to claim 1, wherein the amount of the organic solvent in the step (A) is 10 to 20 times by mass the amount of the polyoxyethylene derivative.

13. The method according to claim 3, wherein the amount of the organic solvent in the step (A) is 10 to 20 times by mass the amount of the polyoxyethylene derivative.

14. The method according to claim 1, wherein the amount of the organic solvent in the step (E) is 10 to 20 times by mass the amount of the polyoxyethylene derivative.

15. The method according to claim 3, wherein the amount of the organic solvent in the step (E) is 10 to 20 times by mass the amount of the polyoxyethylene derivative.

* * * * *